June 21, 1927.  J. F. O'CONNOR  1,633,033
FRICTION SHOCK ABSORBING MECHANISM
Original Filed May 27, 1925   2 Sheets-Sheet 2
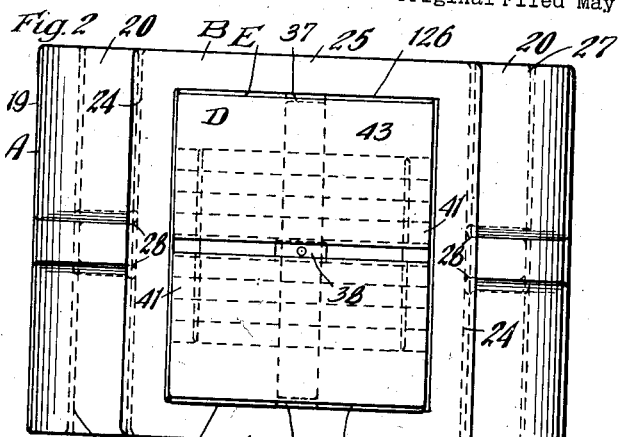
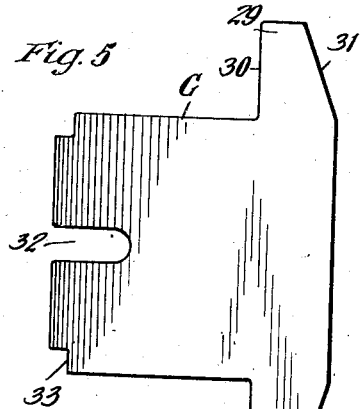
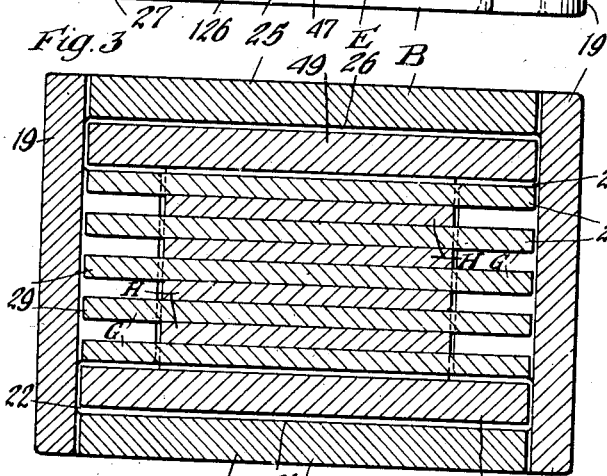
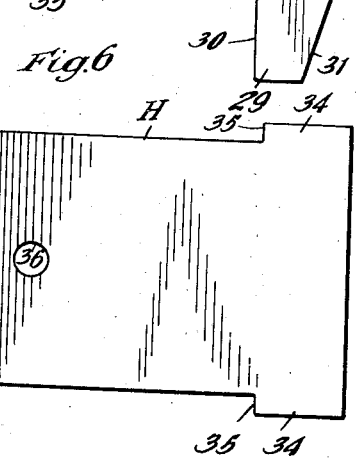
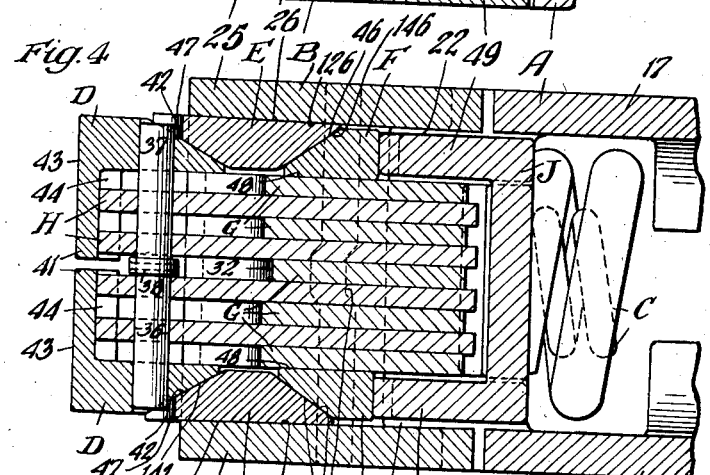
Witness
Wm Geiger
Inventor
John F. O'Connor
By George I Haight
Atty.

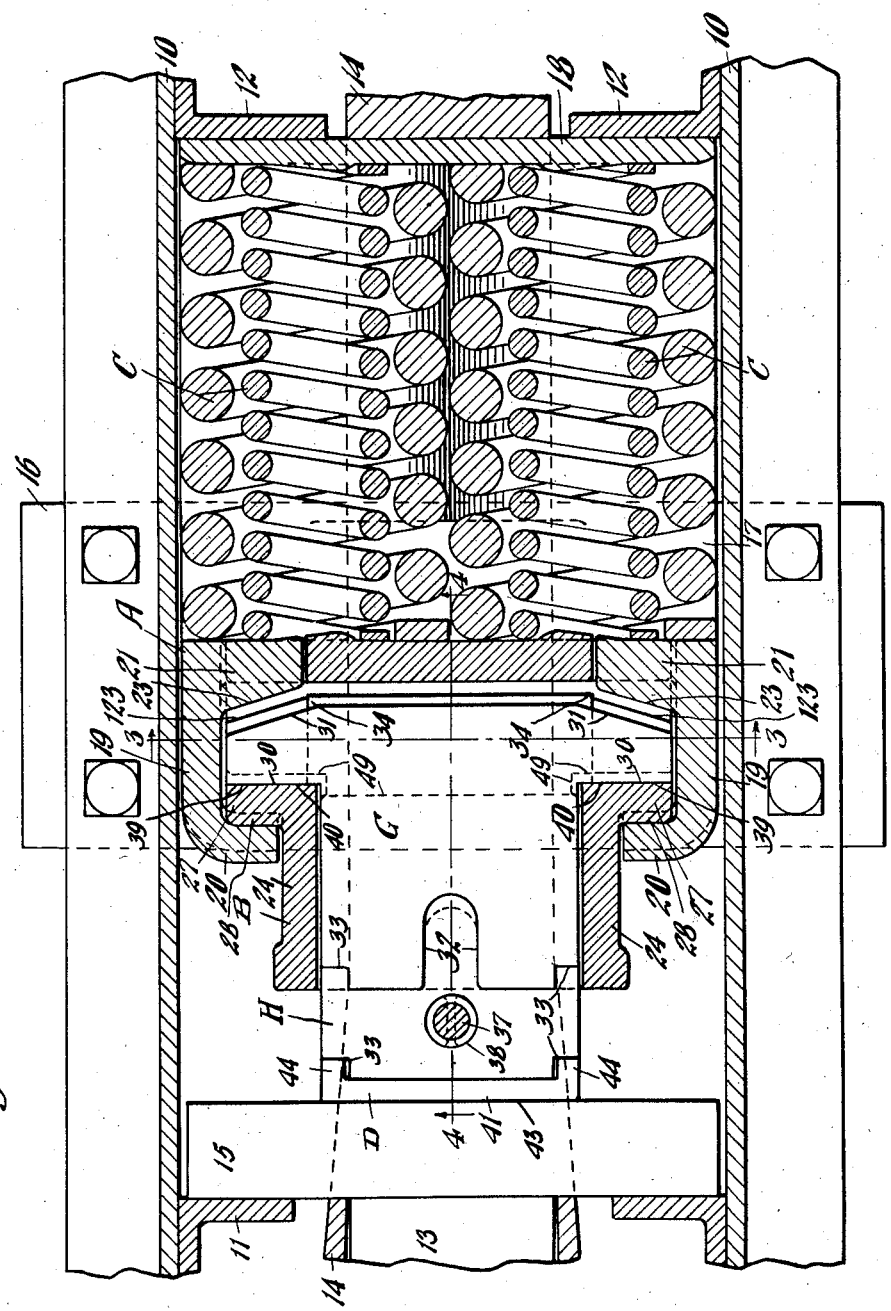

Patented June 21, 1927.

1,633,033

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed May 27, 1925, Serial No. 33,163. Renewed April 18, 1927.

This invention relates to improvements in friction shock absorbing mechanisms.

One object of the invention is to provide a friction shock absorbing mechanism, especially adapted for railway draft riggings, having high capacity combined with graduated action, including a spring cage, a friction shell, a friction wedge system including friction shoes, a plurality of intercalated friction plates and a spring resistance, wherein the friction shell and cage have limited relative movement resisted by the spring during initial action to absorb the lighter shocks, followed by movement successively of the friction shoes and plates bodily with reference to the shell, and of the plates with reference to each other, during the remainder of the compression stroke, to produce the graduated action.

Another object of the invention is to provide means for maintaining the mechanism of uniform overall length regardless of wear of the friction and wedge elements, including means for limiting the outward movement of certain of the friction plates and inter-engaging movement limiting means on said plates and wedge system.

Other objects and advantages of the invention will more fully and clearly appear from the description and claims hereinafter following.

In the drawings forming a part of this specification Figure 1 is a horizontal, longitudinal, sectional view of a portion of a railway draft rigging, showing my improvements in connection therewith. Figure 2 is a front end, elevational view of the shock absorbing mechanism proper. Figure 3 is a transverse vertical, sectional view corresponding substantially to the line 3—3 of Figure 1. Figure 4 is a longitudinal, vertical, sectional view of the front end portion of the shock absorbing mechanism proper, corresponding substantially to the line 4—4 of Figure 1. And Figures 5 and 6 are detailed, plan views respectively of two of the friction plates employed in connection with my improved mechanism.

In said drawings, 10—10 indicate channel-shaped center or draft sills of a railway car underframe, to the inner surfaces of which are secured front stop lugs 11—11 and rear stop lugs 12—12. The inner end portion of the draw-bar is designated by 13, to which is operatively connected a hooded yoke 14 of well-known form. The shock absorbing mechanism proper as well as a main follower 15 are disposed within the yoke. The yoke and the parts therewithin are operatively supported by a detachable saddle plate 16 suitably fixed to the draft sills.

My improved shock absorbing mechanism proper, as shown, comprises broadly, a friction shell B; twin spring cage A; a friction shell B; twin spring cage A; arranged main spring resistance elements C—C; a pair of wedge friction elements D—D; two pairs of friction wedge shoes E and F; two sets of friction plates G and H; and a spring follower J.

The spring cage A is in the form of a substantially rectangular box-like casting having horizontally disposed top and bottom walls 17—17; a transverse rear end wall 18, and relatively short spaced side walls 19—19 at the forward end thereof. The end wall 18 co-operates with the rear stop lugs 12 in the manner of the usual rear follower. At the forward end, the side walls 19 of the casting are provided with opposed, inwardly projecting vertical flanges 20—20. At the inner end of each side wall 19, a lateral enlargement 21 inwardly extending therefrom is provided. The enlargements 21 are in transverse alinement and spaced apart to accommodate the central portion of the spring follower J therebetween. The enlargements 21 terminate short of the top and bottom walls of the casting A as most clearly shown in Figure 4, thereby providing guide ways 22 for a purpose hereinafter described. Each enlargement 21 is provided with an inwardly and rearwardly inclined flat abutment face 23 at the forward side thereof. The top and bottom walls 17 of the casting have openings corresponding in width to the space between the flanges 20 and the enlargements 21 on the side walls 19. The casting A is left open at the opposite sides for the major portion thereof to permit lateral insertion of the spring follower, friction plates G and H and the main springs C when the mechanism is being assembled.

The friction shell B is also in the form of a substantially rectangular box-like casting having spaced side walls 24—24 and horizontally disposed spaced top and bottom walls 25 having opposed inwardly inclined flat friction surfaces 26 on the inner sides thereof. At the rear end, the friction shell B is provided with lateral enlargements 27 adapted to be accommodated between the flanges 20 and the enlargements 21 of the spring cage to maintain the friction shell in assembled relation with the former. In assembling the friction shell with the spring cage, the enlargements at the rear end of the friction shell are disposed within the opening between the flanges 20 and the enlargements 21 by entering the same laterally through the opening of either the top or bottom wall of the casting A. At the rear side, each lateral enlargement 27 has an inclined abutment face 123 adapted to cooperate with the face 23 of the corresponding enlargement 21 of the spring cage A. As most clearly shown in Figure 1, the distance between the front walls and the inclined walls 23 of the enlargements 27 is less than the distance between the corresponding flanges 20 and enlargements 21 of the spring cage, thereby permitting a limited amount of relative movement between the friction shell and the spring cage longitudinally of the mechanism. To maintain the friction shell and spring cage in assembled relation when the parts are in full release position, each of the enlargements is provided with a rib 28 at the front side thereof adapted to co-operate with an indentation on the corresponding flange 20 of the spring cage.

The friction plates G and H are arranged in a group disposed centrally between the top and bottom walls of the friction shell. The group of plates preferably consists of five plates G and four plates H, the plates G and H thereof being alternated. The plates G are all of like design, and as most clearly shown in Figure 5, each plate G comprises an elongated main body portion having laterally projecting wings 29 at the rear end thereof. Each of the wings 29 is provided with a transverse flat front edge 30 and an inclined rear flat edge 31. Each of the flat edges 31 is correspondingly inclined to the flat face 23 of the enlargement 21 at the corresponding side of the spring cage and adapted to co-operate therewith to limit the inward movement of the plates G. The main body portion of each plate G is centrally slotted at the forward end as indicated at 32 for a purpose hereinafter described. The forward end of the main body portion of each plate G is also notched at opposite sides as indicated at 33.

The plates H are also all of like design, each plate being of substantially rectangular outline provided with lateral projections 34 at the rear end thereof, thereby presenting forwardly facing transverse shoulders 35 for a purpose hereinafter described. The forward end portion of each plate H is notched at opposite sides similarly to the plates G, the notches also being indicated by 33. Adjacent the forward end, each plate H is provided with a central opening 36 adapted to receive an anchoring pin 37, the pin 37 being provided with a central collar 38 keyed thereto, as most clearly shown in Figure 4. The collar 38 prevents the pin from dropping out by engagement with the two adjacent plates H when the parts are assembled. As most clearly shown in Figure 1, the enlarged portions at the inner end of the friction shell are provided with centrally disposed openings 39 adapted to accommodate the wings of the plates G and the lateral extensions 34 of the plates H. The openings 39 present transverse, flat front end walls 40 adapted to form abutments co-operating with the front edges 30 of the wings 29 of the plates G and the abutment edges 35 of the enlargements 34 of the plates H to limit the outward movement of the plates G and H with reference to the friction shell. As most clearly shown in Figures 1 and 5, the wings 29 of the plates G are of such a width that the inclined rear edges 31 thereof are spaced a greater distance from the abutment faces 23 on the enlargements 21 of the spring cage than the abutment faces 123 of the shell are spaced from said faces 23 when the parts are in normal full release position with the transverse front edges 30 of the plates G abutting the transverse walls 40 of the friction shell B. As most clearly shown in Figures 3 and 4, two of the friction plates G are disposed outermost of the group and each of the same is adapted to co-operate with one of the friction wedge elements and the corresponding friction shoes E and F.

The wedge friction elements D which are two in number, are disposed respectively at the top and bottom of the mechanism. The elements D are of like design, but reversely arranged as most clearly shown in Figure 4. Each of the wedge elements D comprises a longitudinally disposed main body portion and a laterally extending plate-like section 41 inwardly projecting therefrom. At the inner end, the main body portion of each element D has an outer flat wedge face 42 adapted to cooperate with the corresponding friction wedge shoe E. Each element D is also provided with a flat outer transverse face 43 adapted to abut the inner side of the front main follower 15. The inner surface of the plate-like section 41 of each wedge element is adapted to engage the outer ends of two of the friction plates H. As most clearly shown in Figure 1, the plate-like section 41 is provided with top and bottom flanges 44 and the plates H are notched at 33 as hereinbefore pointed out, to accommodate these flanges. On the inner side, the main body portion of each friction wedge element has a flat longitudinally extending friction surface 45 adapted to co-operate with the outermost friction plate G at the corresponding side of the group. The plates H are anchored to the two wedge friction elements D by the pin 37 as most clearly shown in Figures 1 and 4, the main body portion of said wedge elements being provided with openings to accommodate the opposite ends of said pin.

The wedge friction shoes E which are in the form of relatively heavy blocks are also of like design. Each block E is provided with an outer, longitudinally disposed friction surface 126 adapted to co-operate with the corresponding friction surfaces 26 of the friction shell. At the forward end thereof, each block E has an inner wedge face 142 adapted to co-operate with the wedge face 42 of the corresponding wedge friction element D. At the rear end, each block E has an inner wedge face 46 adapted to co-operate with the corresponding wedge friction shoe F. Each block E is also slotted centrally at the outer end thereof as indicated at 47 to accommodate the corresponding end of the pin 27.

The friction wedge shoes F, which are also of like design, co-operate with the outermost plates G at the top and bottom of the group of friction plates. Each block F has a longitudinally disposed flat inner friction surface 48 adapted to co-operate with the corresponding friction plate G. At the forward end, each block has an outer wedge face 146 correspondingly inclined to and adapted to co-operate with the wedge face 46 of the corresponding friction wedge shoe E.

The spring follower J is in the form of a channel member including a main body section, centrally cut away at opposite sides as most clearly shown in Figures 1 and 3 to accommodate the corresponding enlargements 21 on the side walls of the spring cage. At the top and bottom, the spring follower J is provided with forwardly extending, horizontally disposed, relatively heavy flanges 49 adapted to work in the guide ways 22 at the top and bottom of the friction shell. The front edge of each flange 22 is adapted to abut the flat rear end face of the corresponding wedge friction shoe F as most clearly shown in Figure 4. The opposite ends of the top and bottom flanges 49 are also adapted to work in the openings 39 at the inner end of the friction shell. The flanges 49 are cut away along the front edges thereof at opposite sides to provide clearance between the same and the abutment walls 40 of the friction shell, thereby permitting a limited amount of outward movement of the spring follower to compensate for wear of the various friction and wedge surfaces of the parts.

The twin spring resistance elements C are interposed between the transverse end wall of the spring cage and the spring follower J. Each element of the twin spring resistance preferably comprises a relatively heavy outer coil and a light inner coil. As shown in Figure 1, the coils of the spring resistance elements are also adapted to bear at their outer ends on the rear faces of the lateral enlargements 21 of the spring cage in full release.

In assembling the mechanism, the friction shell B is attached to the spring cage by lateral insertion of the enlargements 27 thereof between the flanges 20 and the enlargements 21 of the spring cage. The friction plates G and H, the spring follower J and the twin arranged main spring resistance elements are then assembled by entering the same through one of the openings in the sides of the spring cage, the plates G and H being inserted within the spring cage through the rear end thereof. In this connection, it will be noted that when the parts are assembled and in full release position the forwardly projecting flanges 49 of the spring follower J extend into the rear end of the friction shell and prevent lateral separation thereof from the spring cage. After the friction plates have been placed in position, the friction shoes F and E and the friction wedge elements D are assembled with the friction shell, the elements D being anchored to the plates H by the pin 37.

The normal position of the parts is that shown in Figures 1 and 4. In the normal position the outer ends of the friction plates H engage the inner sides of the plate-like sections 41 of the friction wedge elements D, the front walls of the enlargements 27 of the friction shell abut the flanges 20, the transverse edges 30 and 30 of the friction plates G and H abut the transverse walls 40 of the friction shell, and the flanges 49 of the spring follower J abut the inner ends of the friction shoes F. In this connection, it is pointed out that inasmuch as the outward movement of the friction plates H is limited by engagement of the enlargements 34 thereof with the walls 40 of the friction shell and as the wedge friction elements D are anchored to the plates by the pin 37, outward movement of the wedge elements D and friction shoes E and F will be positively limited and the mechanism maintained of uniform overall length.

Compensation for wear of the various friction and wedge faces is taken care of by the expansion of inner portions of the main springs, outward movement of the spring follower being permitted due to the clearance between the same and the transverse walls 40 of the friction shell as hereinbefore pointed out. In the assembled condition of the parts, the main springs C are preferably placed under initial compression.

In the operation of my improved shock absorbing mechanism assuming a compression stroke, the front follower 15 and the spring cage A will be moved relatively toward each other, carrying the wedge friction elements D inwardly and setting up a wedging action between the same and the friction shoes E and between the latter and the friction shoes F, forcing the friction shoes E against the friction surfaces of the shell and the friction surfaces of the wedge elements D and shoes F against the outermost plates G of the group. Due to the friction existing between the plates, friction wedge elements, friction shoes and the friction shell, all of these parts will be carried inwardly in unison during the initial compression of the mechanism. This action will continue until the abutment surfaces 123 of the friction shell come into engagement with the surfaces 23 of the spring cage, whereupon relative movement of the friction shell and spring cage will be positively limited. Upon further relative movement of the main follower and spring cage, the friction shoes E will be forced to slide inwardly on the friction surfaces of the shell, the shoes F and the friction plates being carried inwardly in unison therewith due to the friction existing between these parts. The described action will continue until the abutment edges 31 of the plates G engage the abutment faces 23 of the spring cage, whereupon the plates H will be forced to move relatively to the plates G and the friction wedge elements D, and the friction shoes F will be forced to slide on the outermost friction plates G of said group. It will thus be evident that the compression of the mechanism takes place in three increasing stages, the resistance being greatly augmented during the last stage described, due to the relative movement of the friction plates. The compression of the mechanism will continue until the actuating force is reduced or the front follower 15 comes into abutment with the outer end of the friction shell, whereupon the pressure will be transmitted directly through the shell and spring cage to the corresponding stop lugs, thereby preventing the main springs from being driven solid.

During release, the main springs will act to restore all of the parts to normal position, the plates H being carried outwardly with the friction wedge elements D inasmuch as they are anchored to the same by the pin 37. Due to the friction between the parts, the plates G will be dragged outwardly with the plates H and the wedge friction shoes until outward movement thereof is limited by engagement of the abutment edges 30 thereof with the walls 40 of the friction shell. Outward movement of the plates H will be similarly limited by engagement of the abutment edges 35 thereof with said transverse abutment faces 40.

From the preceding description taken in connection with the drawings, it will be evident that I have provided a friction shock absorbing mechanism which has graduated action comprising three successively increasing stages of resistance. By this arrangement my gear is particularly adapted for passenger car service, as abrupt and sudden shocks are entirely eliminated due to the blending of the different stages of resistance.

While I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with a column element; of a friction shell, said shell and element having limited relative movement; a main spring resistance; a plurality of intercalated friction plates within the shell; lateral pressure creating means co-operating with said plates; pressure transmitting means for forcing said plates inwardly of the mechanism, said means being anchored to certain of said plates; and means for arresting movement of the remaining plates after a predetermined compression of the mechanism.

2. In a friction shock absorbing mechanism, the combination with a column member; of a friction element, said element and member having limited relative movement; a main spring resistance; a plurality of intercalated friction plates co-operating with said element; means for limiting outward movement of said plates; means for placing said plates under lateral pressure and forcing the same against said element; means co-operating with certain of said plates for forcing the same longitudinally of the mechanism, said last named plates being anchored to said last named means for limiting the outward movement of the latter; and means for arresting movement of the remaining plates after a predetermined compression of the mechanism.

3. In a friction shock absorbing mechanism, the combination with a column member; of a friction shell, said shell and member having limited relative movement; a main spring resistance; a central group of intercalated friction elements co-operating with the shell; means disposed at the sides of said groups of elements for placing the same under lateral pressure; means associated with said last named means engaging certain of said elements for moving the same inwardly after a predetermined compression of the mechanism; and means for arresting movement of the remaining elements prior to full compression of the mechanism.

4. In a friction shock absorbing mechanism, the combination with a spring cage; of a friction shell, said shell and cage having limited relative movement; co-operating means on said shell and cage for arresting relative movement thereof after a predetermined initial compression of the mechanism; spring resistance means within said cage co-operating with the shell; a group of intercalated friction elements within said shell, said elements being bodily movable with reference to the shell; means at the opposite sides of said group of elements for placing the same under lateral pressure; means on the cage co-operating with certain of said elements for arresting movement of the latter prior to full compression of the mechanism; and means co-operating with the remaining elements for forcing the same inwardly of the mechanism.

5. In a friction shock absorbing mechanism, the combination with a spring cage; of a friction shell, said shell and cage having limited relative movement; a spring resistance within said cage; a plurality of intercalated friction elements co-operating with the shell, said elements being bodily movable with reference to the shell to a limited extent; wedge friction shoes co-operating with said elements and shell; means on said cage for arresting movement with reference to the cage successively of said shell and certain of said elements; and wedge means co-operating with said shoes, said wedge means being anchored to the remaining elements and having means thereon engaging said last named elements for carrying the same inwardly of the shell and effecting relative movement between said last named elements and said arrested elements during the final compression of the mechanism.

6. In a friction shock absorbing mechanism, the combination with a spring cage; of a main follower acting member having wedge means associated therewith, said member and cage being relatively movable with reference to each other; a friction shell, said shell and cage having limited relative movement; a plurality of intercalated friction plates within the shell, said intercalated plates being movable as a unit during a predetermined portion of the compression stroke, certain of said plates having engagement with the cage to limit their movement inwardly of the mechanism while the remaining plates are adapted to be actuated by said follower acting member and moved inwardly with reference to the remaining plates; a plurality of wedge friction shoes, certain of which have frictional engagement with the shell friction surfaces while the remaining shoes have frictional engagement with said intercalated plates; and spring means resisting movement of said shoes and shell inwardly of the cage.

7. In a friction shock absorbing mechanism, the combination with a spring cage, of a friction shell having inwardly converging friction surfaces, said shell and cage having limited relative movement; a follower, said follower and cage being relatively movable with reference to each other; wedge means co-operating with said follower; a group of intercalated friction plates within the shell, said group of plates being movable as a unit with reference to the cage during a predetermined portion of the compression stroke, certain of said plates having engagement with the cage to limit their relative movement inwardly of the latter, while the remaining plates of said group are adapted to move inwardly relatively to the shell; wedge friction shoes co-operating with said group of plates; additional friction wedge shoes interposed between said wedge means and first named shoes and having frictional engagement with the shell; a spring follower; and a main spring interposed between said follower and cage.

8. In a friction shock absorbing mechanism, the combination with a spring cage; of a friction shell having inwardly converging friction surfaces, said shell and cage having limited relative movement; a follower, said follower and cage being relatively movable with reference to each other; wedge means co-operating with said follower; a group of intercalated friction plates within the shell, said group of plates being movable as a unit with reference to the cage during a predetermined portion of the compression stroke, certain of said plates having engagement with the cage to limit their relative movement inwardly of the latter, while the remaining plates of said group are adapted to move inwardly relatively to the shell; wedge friction shoes co-operating with said group of plates; additional friction wedge shoes interposed between said wedge means and first named shoes and having frictional engagement with the shell; and a main spring resistance co-operating with said shoes and cage.

9. In a railway draft rigging, the combination with draft sills provided with front and rear stops; of a spring cage cooperating with certain of said stops; a friction shell, said cage and shell having limited relative movement; a main follower co-operating with the remaining stops; a yoke embracing said follower and cage; a group of intercalated friction plates within said shell, said plates being movable bodily as a unit with reference to said cage during a predetermined portion of the compression stroke of the mechanism, certain of said plates having engagement with the cage to limit their movement inwardly of the latter while the remaining plates are adapted to move inwardly relatively to the cage; wedge pressure creating means disposed on opposite sides of said groups of plates for placing said plates under lateral pressure; and a main spring resistance within the cage.

In witness that I claim the foregoing I have hereunto subscribed my name this 25th day of May 1925.

JOHN F. O'CONNOR.